3,337,698
PROPORTIONAL CONTROLLER
William O. Purcell, Jr., Maitland, Fla., assignor, by mesne assignments, to the United States of America as represented by the Secretary of the Navy
Filed Sept. 30, 1965, Ser. No. 492,362
7 Claims. (Cl. 200—6)

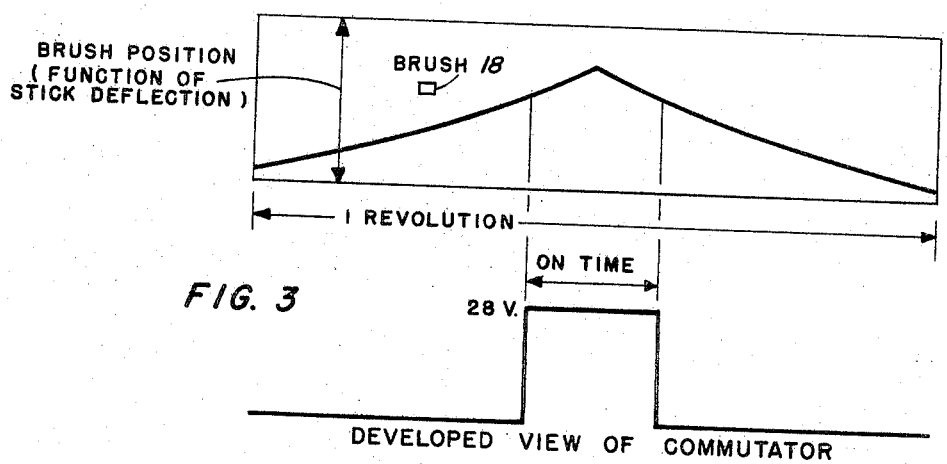
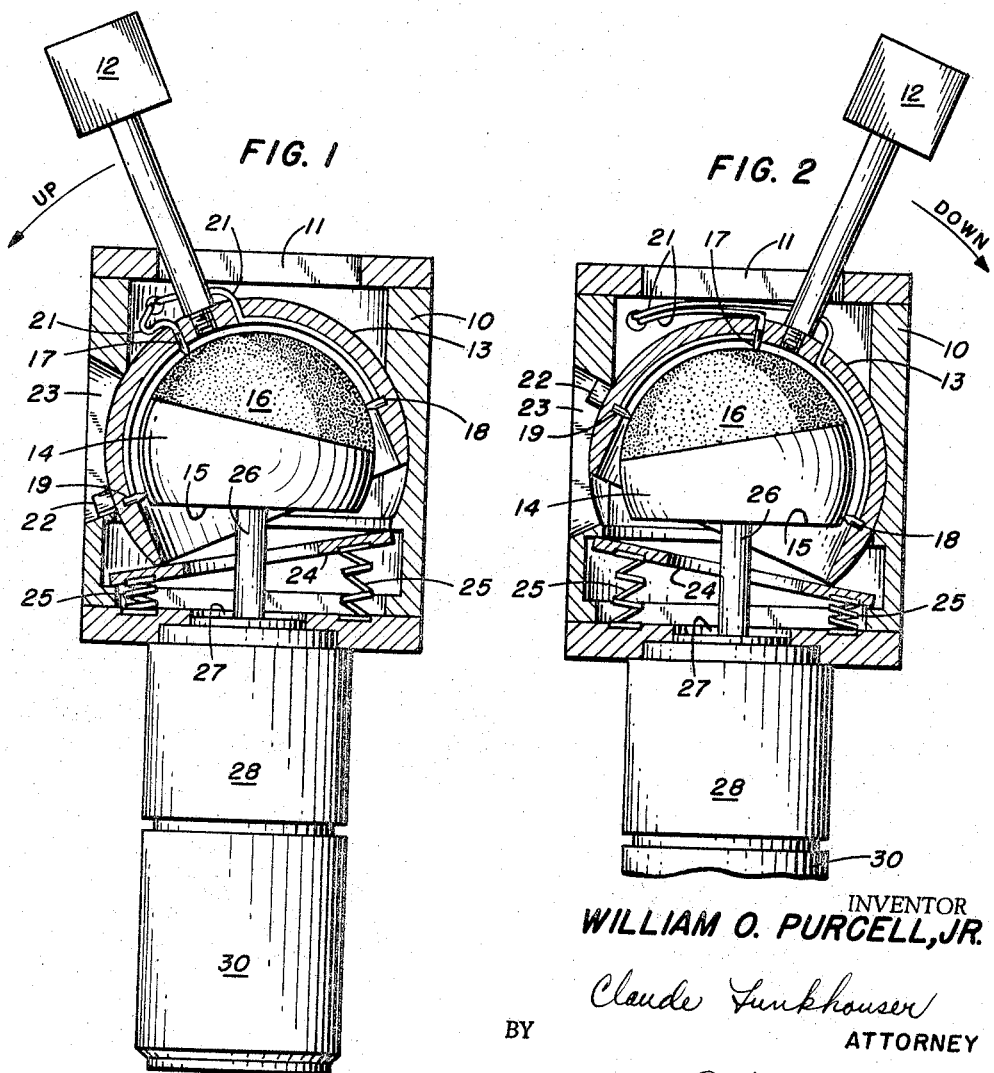

ABSTRACT OF THE DISCLOSURE

A proportional controller, joy stick, or toggle switch which will produce a signal when the controller handle is moved in any of the four cardinal directions. A motor driven, ball-shaped commutator is enclosed in an outer, movable shell which has contacts on the inner side of the shell touching the commutator. Movement of the controller handle moves the shell so that certain ones of the contacts touch the conductive portion of the commutator.

---

The present invention relates to a proportional controller and more particularly to a controller which gives an indication of the movement of a control stick in any of the four cardinal directions.

In the operation of certain kinds of equipment and devices from a remote position, it is usually necessary to apply control forces to the slave, or follower, device in each of the four cardinal quadrants or combinations thereof, in order to obtain movement in any direction. A good example of this is the electronic control of a drone airplane, or even a model plane, wherein the remote control device is an electronic operating "joy" stick, or controller, which relays signals to the drone to make it go right or left, up or down. These remote operating "joy" sticks of the prior art, while serving a real purpose, nevertheless, do have limitations and drawbacks. As an illustration, one of the limitations may reside in the fact that the "joy" stick consisted of a controller in the form of a toggle switch energized in each of the four quadrants, wherein the switch would operate a relay to transmit energy to the drone. Unfortunately, however, when the relay functioned, power was fully applied, or not, all or nothing, and there was no means of adjusting the amount of energy applied between these two limits.

The controller forming the basis for the present invention, however, offers a material and much needed improvement to the prior art. In the invention there is a ball on the end of a motor driven shaft, an outer portion, but not all, of the ball's surface being covered with an electrically conducting substance. Concentric with the ball, and covering the outer surface of it is a hollower shell which is moved around the ball by the controller handle. Electric contacts on the underside of the shell complete a circuit depending upon whether or not they touch the conducting portion of the ball. From this structure it is clear that the utilization circuit of the invention is energized for a time proportional to the deflection angle at which the controller handle is tilted, thereby producing an output which varies from zero to maximum, in any quadrant, as desired. Furthermore, due to the contour of the conducting portion of the ball, output from the brushes, when they contact this conducting portion, is essentially a square wave, the duration time of which depends upon the deflection of the controller handle.

An object of the present invention is to provide a proportional controller.

Another object is to provide a proportional controller which can produce an output in each of the four cardinal quadrants.

Still another object is to provide a proportional controller which produces an output that is basically a square wave.

Yet another object is to provide a proportional controller in which the conduction time is proportional to the deflection of the controller stick in one of the four cardinal directions.

Other objects, advantages and novel features of the invention will become apparent from the following detailed description of the invention when considered in conjunction with the accompanying drawings in which like reference numerals designate like parts throughout the figures thereof and wherein:

FIG. 1 illustrates a side elevation of the invention, showing the controller in the up position;

FIG. 2 illustrates a side elevation of the invention, showing the controller in the down position;

FIG. 3 shows a chart of the output of the controller.

Referring now to the drawings there is shown in FIG. 1 a proportional controller having an outside case 10 through a slot 11 in which there extends a controller arm 12. Integrally attached to the innermost end of controller arm 12 is a hollow arcuate shell 13, which obviously will pivot back and forth as controller arm 12 is moved.

Concentric with, and positioned within, the hollow confines of the arcuate shell 13 is a ball-shaped commutator 14 which is spherical in configuration and, except for a flattened portion 15 on its bottom, is essentially a ball. Across the upper end of the commutator 14 there is an area which is coated with an electrically conductive substance 16. From FIGS. 1 and 2 it can be seen that the border of the electrically conductive area 16 is not drawn normal to the centerline of the ball, for reasons which will be obvious hereinafter as the description progresses.

Positioned on the underside of hollow shell 13, and located so as to contact the surface of ball commutator 14 are a plurality of brushes, such as 17, 18 and 19, these brushes having electrical leads 21 which pass through the case 10 to form an electrical circuit external to the controller. A pin 22, also formed as part of shell 13, moves in a groove 23, cut into the side of case 10, to thereby guide the movement of shell 13 and to act as a limit control.

Located at the bottom of case 10 and below the lower tips of hollow shell 13 so as to bridge them, is a plate 24 which is balanced at its outer sides by springs 25. As can be clearly seen in FIGS. 1 and 2, the plate 24 and springs 25 function as a centering device to keep hollow shell 13 correctly positioned in case 10, and also as a detent once the controller arm 12 has been activated. The springs on one side of plate 24 compress while they extend on the other side, as shown by FIGS. 1 and 2.

Integrally connected to the ball commutator 14, along its centerline, is a drive shaft 26 which passes through a hole 27 in case 10, and connects with a set of reduction gears 28, the reduction gears 28, in turn, being driven by a motor 30.

When the proportional controller making up the invention is in operation the motor 30, through reduction gears 28 and drive shaft 26, drives the ball commutator 14 so that it rotates continuously at a uniform speed. Should a signal in the "up" direction be desired the controller arm 12 is moved to the position shown in FIG. 1. This causes a connection to be made to external circuitry via electrical leads 21 since rotation of the hollow shell 13 about the ball commutator 14 has moved brush 18 up until it, along with common brush 17, are both contacting the electrically conductive area 16 of the commutator.

It should be pointed out here that since the conductive portion 16 is placed on the end of ball commutator 14 at an angle with respect to the drive shaft 26 and centerline of the ball, that brush 18 is not continuously in contact with the conductive part of the ball, as the ball rotates. This effectively results in an "off-on" situation, or a make and break of the circuit as brush 18 leaves the conductive portion and then touches it again. Due to the particular design of the conductive portion 16 the output of the controller is essentially a square wave, as illustrated in FIG. 3. A study of FIG. 3 indicates that the position of the controller arm 12 (and therefore the brushes) determines the duration of the "on time" or the extent of the square wave. Through this expedient a variable output signal is obtained which varies from completely off to fully on, depending upon the position of the controller arm.

Should an indication of the down position be desired, then the controller arm is moved as shown in FIG. 2. In this case brush 18 has moved down until it no longer contacts the conducting area 16 while brush 19 has now moved into contact with it.

Attention is invited to the fact that two other brushes, not shown in the drawings, are located in quadrature with brushes 18 and 19, which cooperate with ball commutator 14 in the same manner as brushes 18 and 19, to give indications when the controller arm is moved to the right and left positions.

From the above description of the structure and operation of the instant invention it is clear that the device offers a substantial improvement over prior art proportional controllers. Thus, the invention provides a controller which produces output signals in each of the four cardinal quadrants, produces a signal which is a square wave in form, and produces a signal which has an "on" time that is proportional to the deflection of the controller arm.

Obviously many modifications and variations of the present invention are possible in light of the above teachings. It is therefore to be understood that within the scope of the appended claims, the invention may be practiced otherwise than as specifically described.

What is claimed is:
1. A proportional controller comprising
   a ball-shaped commutator mounted at one end and adapted for continuous rotation;
   a hollow shell concentric with, and placed around the ball-shaped commutator so as to move in all directions;
   a plurality of brushes on the hollow shell to contact the commutator; and
   a controller handle to move the hollow shell.
2. The proportional controller as in claim 1 wherein the ball-shaped commutator has a portion of its end surface coated with electrically conductive material.
3. The proportional controller as in claim 2 further having a motor for rotating the commutator.
4. The proportional controller of claim 2 wherein the plurality of brushes are located on the under side of the hollow shell so as to make contact with the conductive material on the commutator.
5. The proportional controller of claim 4 wherein there is a common brush always in contact with the conductive material, and other brushes spaced in quadrature with each other, certain ones of said other brushes making contact with the conductive material when the controller arm is moved into one of the cardinal quadrants.
6. The proportional controller of claim 2 wherein the area of the conductive material is formed by a plane subtending an arc across the end of the ball commutator, the plane forming with the center line of the commutator an angle other than 90°.
7. A proportional controller capable of providing signals indicative of all four cardinal quadrants comprising
   a controller arm movable in directions indicative of right, left, up and down;
   a hollow substantially ball-shaped shell, open at its lower portion, integral at its upper portion with the controller arm and movable therewith;
   a first electrical brush located on the periphery of the hollow shell substantially at the center of the upper portion, said brush extending inwardly toward the center of the shell;
   a plurality of other electrical brushes, placed in quadrature with each other, each of these other brushes being located substantially near the rim of the open lower portion of the hollow shell and also extending inwardly toward the center of the shell;
   means connecting the first brush and said plurality of other brushes to an external circuit;
   a ball-shaped commutator concentric with and movable within the hollow shell;
   a motor integrally attached to the commutator for continuously rotating it within the hollow shell; and
   an electrically conductive material covering the upper portion of said commutator, the area encompassed by the conducting material being formed by a plane subtending an arc across the end of the ball commutator, the plane and the centerline of the ball forming an angle other than 90°;
   the first brush being always in contact with the conducting material and one or more of said plurality of brushes contacting said material depending upon movement of the controller arm whereby the output of the controller is substantially a square wave having an "on" time proportional to the deflection of the controller arm.

References Cited
UNITED STATES PATENTS 1,995,708   3/1935   Fischer _____ 200—11

ROBERT K. SCHAEFER, *Primary Examiner.*

J. R. SCOTT, *Assistant Examiner.*